(12) United States Patent
Tolopka

(10) Patent No.: US 7,065,769 B1
(45) Date of Patent: Jun. 20, 2006

(54) METHOD FOR AUTOMATICALLY INSTALLING AND UPDATING DRIVERS

(75) Inventor: Stephen J. Tolopka, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 504 days.

(21) Appl. No.: 09/607,875

(22) Filed: Jun. 30, 2000

(51) Int. Cl.
*G06F 13/00* (2006.01)

(52) U.S. Cl. ............... 719/321; 719/327; 717/168; 717/174; 710/8

(58) Field of Classification Search ........ 717/168–178; 709/321–328; 710/8, 15; 713/1, 2
See application file for complete search history.

(56) References Cited

U.S. PATENT DOCUMENTS

| | | | | |
|---|---|---|---|---|
| 5,291,584 A | * | 3/1994 | Challa et al. ............... | 703/24 |
| 5,459,867 A | * | 10/1995 | Adams et al. ............... | 719/321 |
| 5,829,053 A | * | 10/1998 | Smith et al. ................ | 711/202 |
| 6,016,499 A | * | 1/2000 | Ferguson ................... | 707/104.1 |
| 6,081,850 A | * | 6/2000 | Garney ....................... | 710/15 |
| 6,209,023 B1 | * | 3/2001 | Dimitroff et al. ........... | 709/211 |
| 6,243,774 B1 | * | 6/2001 | Eide et al. .................. | 710/302 |
| 6,425,038 B1 | * | 7/2002 | Sprecher .................... | 710/269 |
| 6,446,141 B1 | * | 9/2002 | Nolan et al. ................. | 710/8 |
| 6,671,789 B1 | * | 12/2003 | He et al. .................... | 711/170 |

OTHER PUBLICATIONS

Plug and Play BIOS Specification Version 1.0A, May 5, 1994; cover page-p. 55; Compaq Computer Corporation, Phoenix Technologies Ltd, Intel Corporation.

Plug and Play ISA Specification Version 1.0a, May 5, 1994; cover p.-iii, pp. 1-65; ©1993, 1994 by Intel Corporation and Microsoft Corporation.

Universal Serial Bus Specification Revision 1.1, Sep. 23, 1998; cover p.-xvi, pp. 1-310; ©1998, Compaq Computer Corporation, Intel Corporation, Microsoft Corporation, NEC Corporation.

IEEE Standard for a High Performance Serial Bus, IEEE Std 1394-1995; Aug. 30, 1996; cover pages, pp. 19-47; Institute of Electrical and Electronics Engineers Inc. (IEEE), New York, NY.

Simple Service Discovery Protocol/1.0, Operating without an Arbiter; Internet Engineering Task Force Internet Draft; Oct. 29, 1999, pp. 1-4, 7-22.

Jini™ Lookup Attribute Schema Specification Version 1.0.1, Nov. 1999, cover pp.-iv, pp. 1-18; ©1999 Sun Microsystems, Inc., Palo Alto, CA.

Service Location Protocol, Version 2, RFC 2608, Jun. 1999; 44 pages; ©The Internet Society (1999).

\* cited by examiner

*Primary Examiner*—Antony Nguyen-Ba
(74) *Attorney, Agent, or Firm*—Derek J. Reynolds

(57) ABSTRACT

A method comprising automatic installation of device drives in which an operating system or other device installation code obtains a unique identifier from a device, uses that unique identifier to locate a driver for the device, downloads the driver from that location, and completes the installation. Various methods of using the unique identifier to locate the driver are enumerated.

17 Claims, 7 Drawing Sheets

| MFR | DEV. CLASS | MODEL # | SUB # |

METHOD FOR AUTOMATICALLY INSTALLING AND UPDATING DRIVERS

BACKGROUND OF THE INVENTION

1. Field of the Invention

The invention relates generally to a method for updating computer systems and more specifically for automatically installing and updating device drivers to eliminate problems of missing, inconsistent, or outdated device drivers.

2. Background

Device drivers used in computer systems are known in the art. A driver is a computer program that controls a device and acts like a translator between the device and computer programs that use the device. Each device generally has its own set of specialized commands that are processed by its corresponding driver. In contrast, most computer programs access devices using generic commands. The driver, therefore, accepts the generic commands from a computer program and then translates them into specialized commands for the device. The controlled device may be either a hardware device (such as a printer, a disk drive, or a keyboard) or a software device (such as a database). A driver for a device is typically supplied on a separate storage medium (floppy disk, CD-ROM, DVD, etc.) accompanying the device. Drivers may also be incorporated in the operating system of a computer system or stored in non-volatile storage on the device itself.

The installation, reinstallation, or updating of a device and its associated driver on a computer system is difficult for unsophisticated users. Industry specifications such as the Plug and Play BIOS Specification v. 1.0a, published May 5, 1994; Plug and Play ISA Specification v. 1.0a, published May 5, 1994; and Universal Serial Bus Specification Revision 1.1, published Sep. 23, 1998 have improved device installation by allowing the operating system to automatically allocate hardware resources to newly installed devices, thus relieving the user of that burden. However, the user is still responsible for providing an up-to-date version of the associated driver and ensuring that it is correctly installed.

This is especially problematic in cases where a driver is being updated or reinstalled because the user is having a problem with the device. In this case, the user generally has two options. First, the user may attempt to find the storage medium containing the driver originally supplied with the device and reinstall that driver; this risks problems with using an old driver that may now be obsolete. Alternatively, the user may search the device manufacturer's web site in order to download an updated driver. In this case, unsophisticated users are required to understand technical jargon and model numbers to ensure that the driver that the user desires matches the device. Even if the user succeeds in finding the new driver, the user must download the driver and ensure that the device installation routine is able to find the new driver. It is therefore desirable to have a system that allows drivers to be automatically located and installed with reduced actions by a user.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
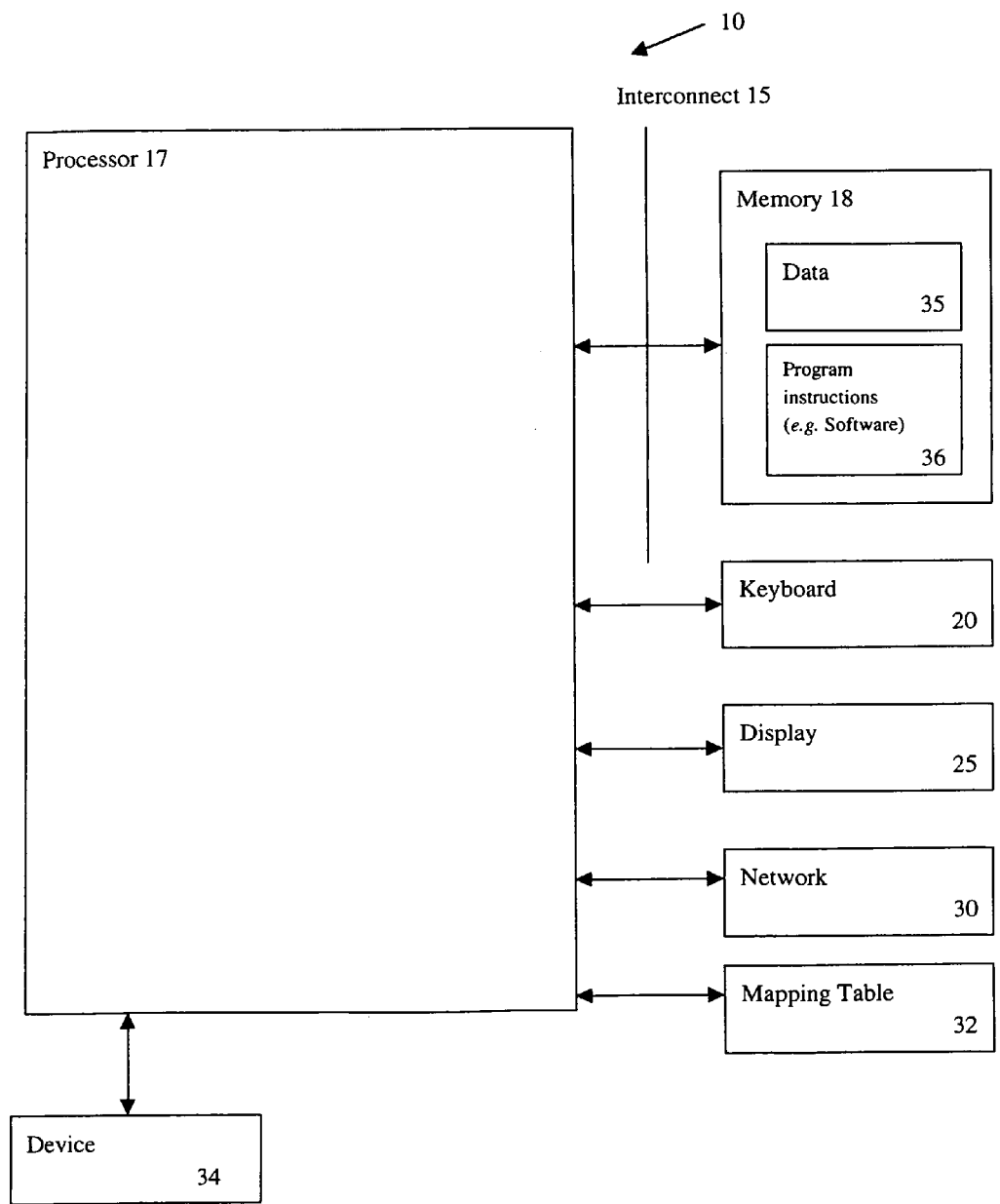
FIG. 1 illustrates a computer system coupled to a mapping table and to a device in accordance with one embodiment of the invention.

FIG. 1 illustrates one embodiment of a computer system 10 that implements the principles of the present invention. Computer system 10 comprises a processor 17, a memory 18, and interconnect 15 such as bus or a point-to-point link. Processor 17 is coupled to the memory 18 by interconnect 15. In addition, a number of user input/output devices, such as a keyboard 20 and a display 25, are coupled to chip set (not shown) which is then connected to processor 17. The chipset (not shown) is typically connected to processor 17 using an interconnect that is different from interconnect 15.

Processor 17 represents a central processing unit of any type of architecture (e.g., the Intel architecture, Hewlett Packard architecture, Sun Microsystems architecture, IBM architecture, etc.), or hybrid architecture. In addition, processor 17 could be implemented on one or more chips. Memory 18 represents one or more mechanisms for storing data. Memory 18 may include read only memory (ROM), random access memory (RAM), magnetic disk storage media, optical storage media, flash memory devices, and/or other machine-readable media. Interconnect 15 represents one or more buses (e.g., accelerated graphics port bus, peripheral component interconnect bus, industry standard architecture bus, X-Bus, etc.) and bridges (also termed as bus controllers).

While this embodiment is described in relation to a single processor computer system, the invention could be implemented in a multi-processor computer system. In addition to other devices, one or more of a network 30 may be present. Network 30 represents one or more network connections for transmitting data over a machine readable medium. The invention could also be implemented on multiple computers connected via such a network.

FIG. 1 also illustrates that the memory 18 has stored therein data 35 and program instructions (e.g., software, computer program, etc.) 36. Data 35 represents data stored in one or more of the formats described herein. Program instructions 36 represents the necessary code for performing any and/or all of the techniques described with reference to FIGS. 2–10. It will be recognized by one of ordinary skill in the art that the memory 18 preferably contains additional software (not shown), which is not necessary to understanding the invention.

Mapping table 32 is coupled to computer system 10. Mapping table is used to provide access to data such as the location of a driver for a particular device. Device 34 is also coupled to computer system 10 by a bus such as an Institute of Electrical and Electronics Engineers ("IEEE") 1394 standard serial bus, std 1394–1995, Standard For A High Performance Serial Bus, (Aug. 30, 1996) or any other suitable bus. Device 34 includes a variety of devices such as digital video camera, digital video monitor, palm pilot, printer, or other device. Techniques of the invention have unique identifiers assigned to device 34 that allow the location of a suitable driver for device 34.

FIGS. 2 through 8 illustrate various embodiments of the invention. Each figure illustrates a device that uses a driver, zero or more mapping table addresses stored within the device, one or more unique identifiers stored within the device, a storage medium containing a driver for the device, and other details needed to clarify that particular embodiment. While the unique identifier may be specific only to a single device (e.g., a serial number), it typically distinguishes the class of devices of which this device is a member (e.g., manufacturer and model number). Additional details concerning the unique identifier are given in subsequent figures. The mapping table addresses and unique identifiers are used to automatically locate and install a driver for the device. The storage medium may be directly attached to the same computer as the device, but is typically located elsewhere in a network to which the computer is coupled.

In each case, operating system or other device installation code obtains the unique identifier from the device, uses that unique identifier to locate a driver for the device, downloads the driver from that location, and completes the installation. Detailed descriptions for various methods of using the unique identifier to locate the driver follow below.

Figure 2:
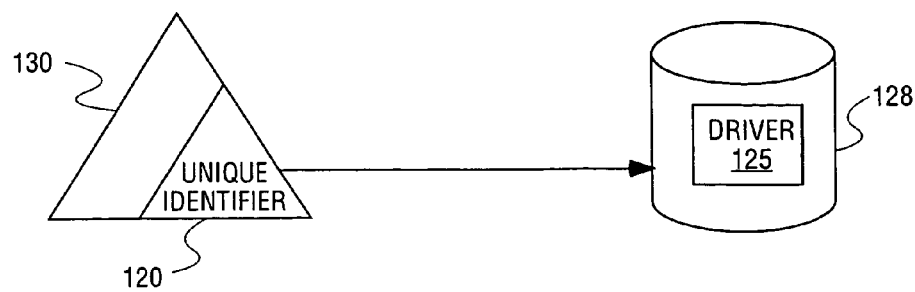
FIG. 2 illustrates a device accessing a storage medium containing a device driver in accordance with one embodiment of the invention.

FIG. 2 illustrates the scenario in which the unique identifier 120 stored within the device 130 is itself the location of the stored driver 125 on the storage medium 128. In this case, the installation software simply uses the unique identifier 125 to directly obtain the stored driver 125 and complete the installation. In one preferred embodiment of this case, the unique identifier 125 is a Universal Resource Locator (URL) indicating a location in the World Wide Web, but those skilled in the art will appreciate that numerous other forms of unique addresses can be used alternatively.

Figure 3:
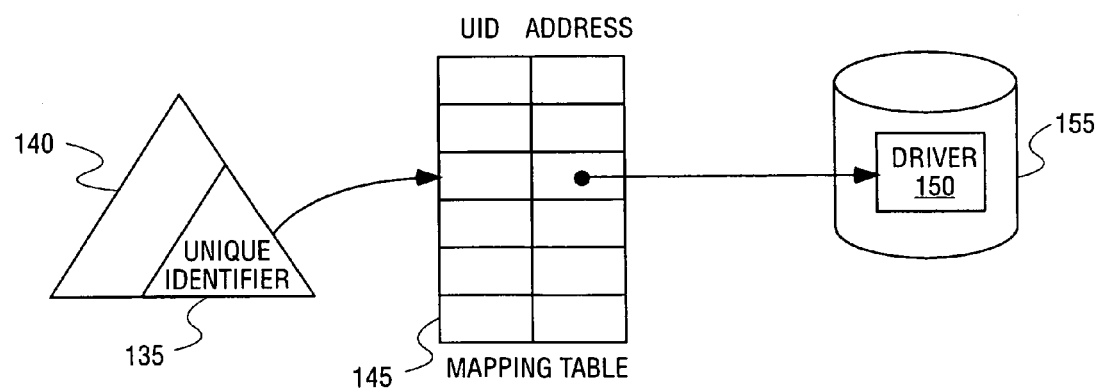
FIG. 3 illustrates a device accessing a storage medium containing a device driver by means of a well-known mapping table in accordance with one embodiment of the invention.

The scenario in FIG. 2 is limited in that a manufacturer providing the device and associated driver must continue to make the driver available at exactly the same network location indefinitely. This limitation makes it awkward for the manufacturer to reorganize the storage containing those drivers (e.g., the manufacturer's web site). FIG. 3 illustrates a different embodiment of the invention that avoids this problem. In FIG. 3, the installation software obtains unique identifier 135 from device 140, then uses the unique identifier as a key in mapping table 145 to obtain the address of driver 150 from storage medium 155. It is assumed that the mapping table is located at a well known (fixed) address. As in FIG. 2, the location of the driver and the well known address of the mapping table are URLs in one preferred embodiment, but other addressing forms may be used. The embodiment of FIG. 3 permits the manufacturer to change the location of driver 150 as desired by updating the address information corresponding to the unique identifier in the mapping table.

Figure 4:
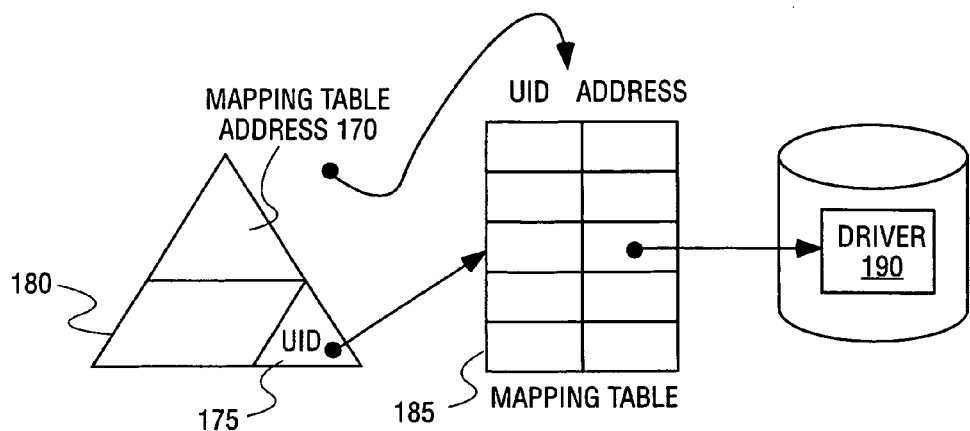
FIG. 4 illustrates a device accessing a storage medium containing a device driver by means of an explicitly specified mapping table in accordance with one embodiment of the invention.

FIG. 3 has the limitation that a single mapping table at a well known address must be used by all manufacturers. This embodiment will not scale well as the number of manufacturers increases and may also incur reliability and security problems. FIG. 4 illustrates a different embodiment that alleviates this problem. In FIG. 4, device 180 contains both the address 170 of mapping table 185 and unique identifier 175. The installation or update software obtains the address 170 of mapping table 185 and the unique identifier 175 from device 180, then uses the unique identifier as a key in mapping table 185 to obtain the location of driver 190. This method allows each manufacturer to maintain a mapping table used to locate drivers for its devices.

Figure 5:
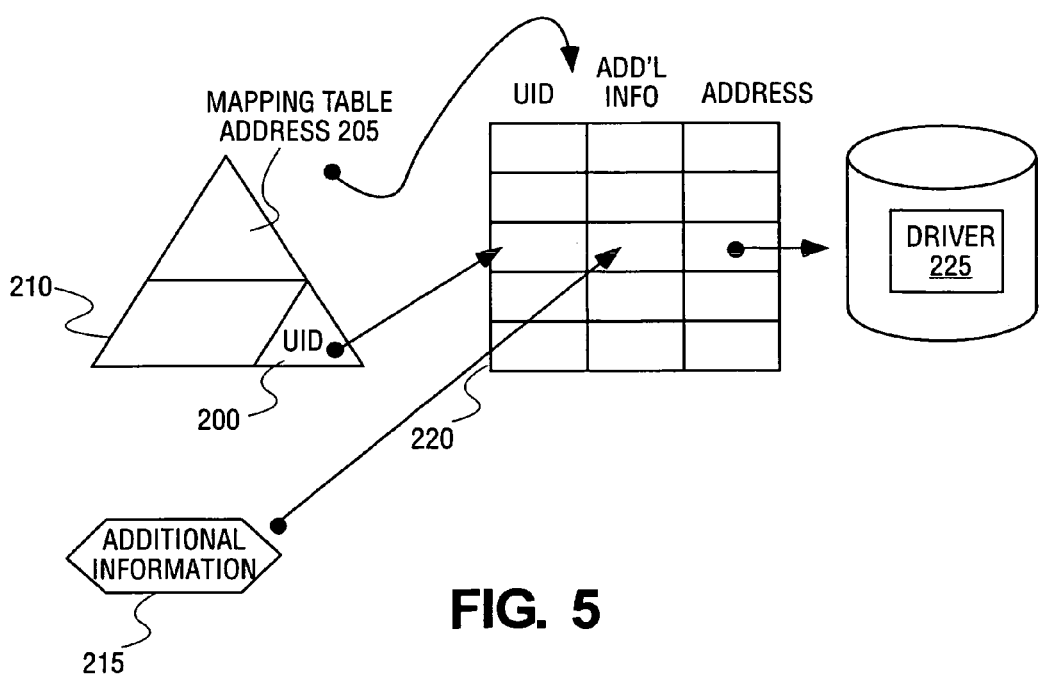
FIG. 5 illustrates a device accessing a storage medium containing a device driver by means of an explicitly specified mapping table and additional information in accordance with one embodiment of the invention.

In FIGS. 2–4, there is exactly one mapping table (and thus one driver) available for use by all devices with a given unique identifier (i.e., devices of a given class or model). However, it is typical for a device manufacturer to offer multiple driver versions for a given device; an obvious example is a "released" version of a driver and a "beta" or experimental version. An embodiment that supports multiple driver versions is shown in FIG. 5. Here, the keys in the mapping table 220 have been expanded to include not only the unique identifier 200 that identifies device 210, but also additional information 215 needed to distinguish desired classes of drivers. The installation software supplies both unique identifier 200 obtained from device 210 and additional distinguishing information 215 to locate driver 225 via the mapping table 220. The additional distinguishing information 215 may be stored in the device itself, in the computing system to which the device is attached (e.g., in the Registry of the Windows 2000® operating system from Microsoft Corporation), or elsewhere on the network to which the computing system is attached. The additional distinguishing information may pertain to a single device (e.g., "use beta drivers with this digital camera"), classes of devices (e.g., "use released versions of drivers for all printers"), or multiple classes of devices (e.g., "use released drivers for all devices unless explicitly specified otherwise").

Figure 6:
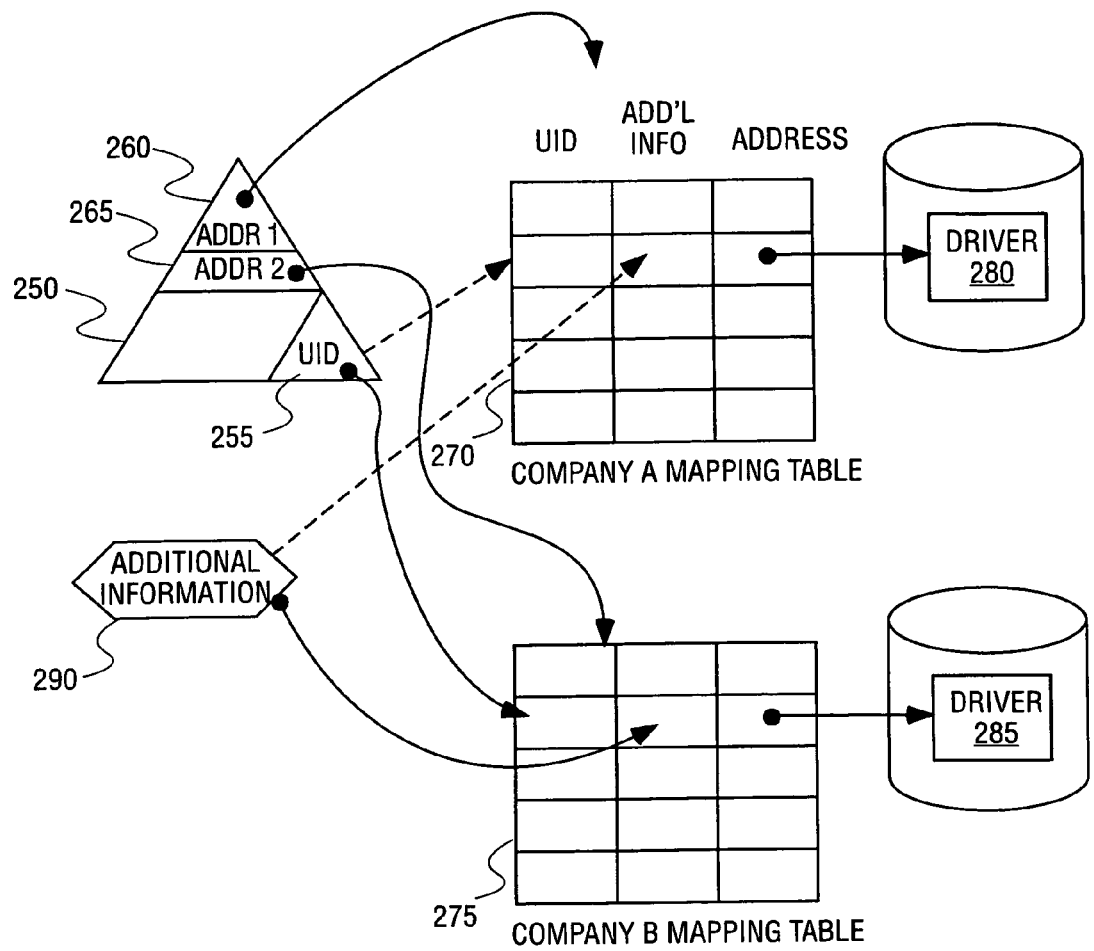
FIG. 6 illustrates a device accessing a plurality of storage media containing device drivers by means of a plurality of mapping tables in accordance with one embodiment of the invention.

In a large company or organization, the Information Technology (IT) group that maintains the organization's computing infrastructure often finds it desirable to specify software that is "approved" for use in that organization. For example, certain revision levels of programs or drivers may have been tested with other software deployed by that organization, while some revision levels have not been tested. In such cases, the IT group may wish to ensure that installed drivers conform to the "approved" list for the organization. In theory, this result can be obtained using the embodiment of FIG. 5, but that solution is awkward in practice. A better solution is shown in the embodiment of FIG. 6, which allows the storage of addresses for multiple mapping tables in the device. The example in this figure shows device 250 manufactured by Company A and deployed in the computing environment at Company B. The device contains two mapping table addresses. Mapping table address 260 is stored in device 250 by Company A at manufacturing time and references mapping table 270 maintained by Company A; mapping table address 265 is stored in device 250 by Company B when the device is deployed and references local mapping table 275 maintained by Company B. In this case, the installation software would first attempt to find a suitable driver using unique identifier 255 and mapping table 275, in this case locating driver 285. If no driver is found using this mapping table (for example, because Company B has no opinion about which versions of a driver are approved for this device), the installation or update software then attempts to find a suitable driver using mapping table 270, in this case locating driver 280. Note that the restriction to two mapping table addresses is for purposes of explanation only, and the invention covers the use of any number of mapping table addresses in the device.

Figure 7:
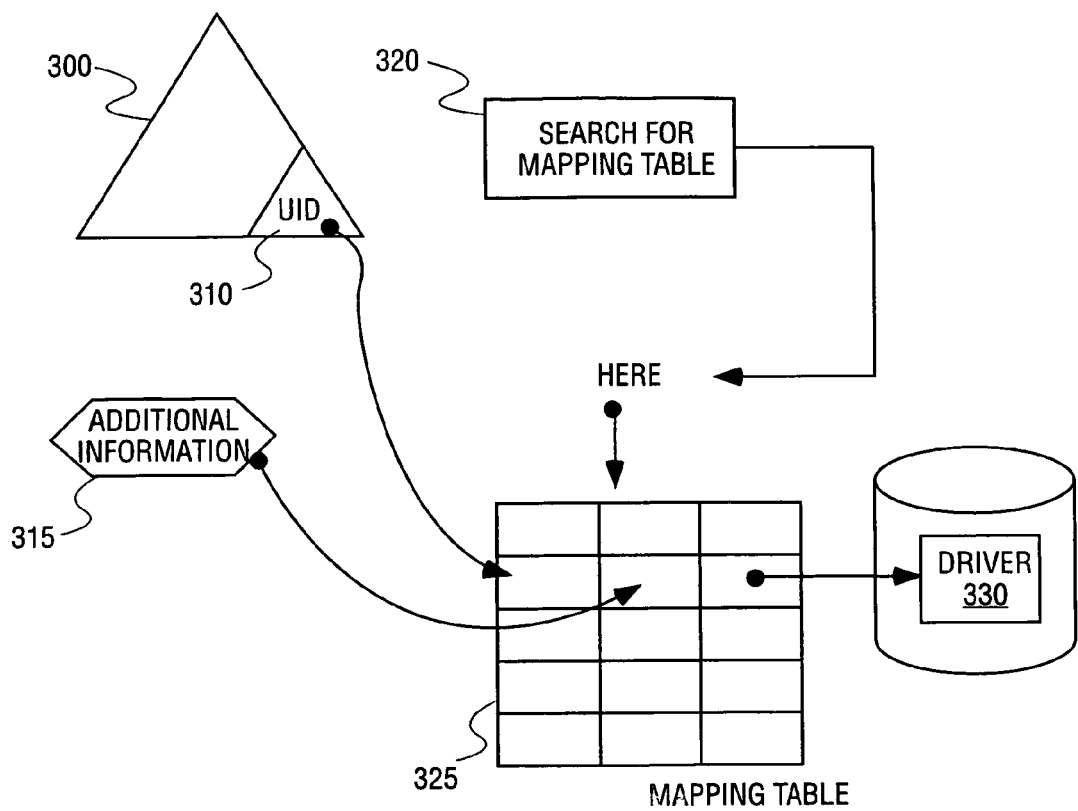
FIG. 7 illustrates a device accessing a storage medium containing a device driver by means of a mapping table discovered through a service location protocol in accordance with one embodiment of the invention.
Figures 8, 9:
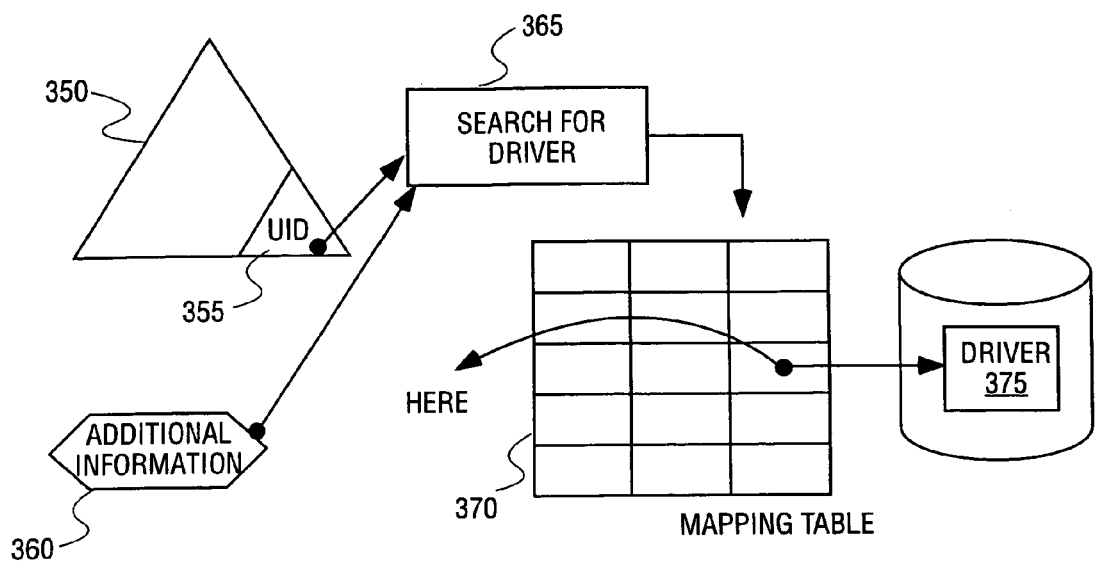
FIG. 8 illustrates a device accessing a storage medium containing a device driver by means of additional information and a mapping table located via a service discovery protocol in accordance with one embodiment of the invention.
FIG. 9 illustrates a unique identifier in accordance with one embodiment of the invention.

While the embodiment of FIG. 6 provides additional flexibility, it still presents practical problems in deployment. Storing the address of Company B's mapping table into each relevant device deployed in its computing infrastructure is labor-intensive, and correctly managing and ordering the plurality of mapping table addresses stored in the device is awkward. A better solution can be obtained by using a service discovery protocol to locate the mapping table instead of storing one or more mapping table addresses directly in the device. FIG. 7 illustrates an embodiment using a service discovery protocol. In this case, the installation or update software invokes a service discovery protocol 320 to obtain the address of the appropriate mapping table 325, then supplies the unique identifier 310 obtained from the device 300 plus any additional distinguishing information 315 as described above to obtain the address of a suitable driver 330. FIG. 8 illustrates an alternative embodiment in which the unique identifier 355 and additional distinguishing information 360 are supplied as parameters to the service discovery protocol 365, which then finds the mapping table 370, performs the lookup, and returns the address of suitable driver 375. It will be appreciated that the embodiments in FIGS. 7 and 8 may use any suitable service discovery protocol. Examples of possible protocols include Simple Service Discovery Protocol (SSDP) as referenced by the Universal Plug and Play Forum (Internet Engineering Task Force Internet-draft "Simple Service Discovery Protocol/1.0, Operating without an Arbiter" most recently updated Oct. 28, 1999); Jini™ Lookup Attribute Schema Specification Version 1.0.1, published November 1999; Service Location Protocol Version 2 (SLP) (Internet Engineering Task Force RFC2608, published June 1999); and location protocols being defined for peer-to-peer file sharing services such as Gnutella, Napster, and FreeNet.

FIG. 9 illustrates one embodiment of a unique identifier being stored in the device. Dividing the identifier into fields that represent the device manufacturer, device class, model number, and revision number provides a structured way to manage the unique identifier name space. It should be evident, however, that numerous other schemes for allocating and managing the unique name space can be used for the purposes of this invention.

Figure 10:
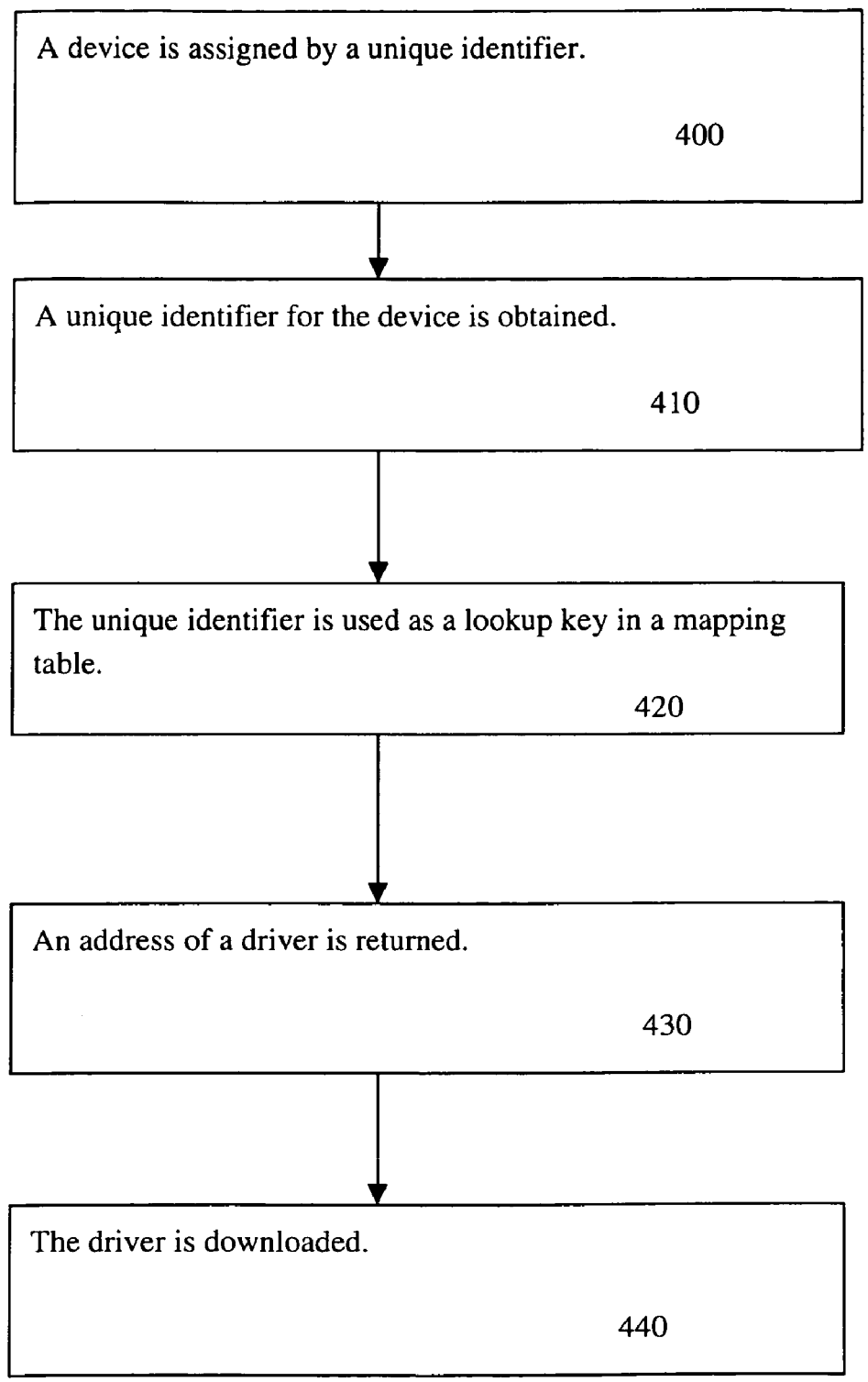
FIG. 10 illustrates a flow diagram in accordance with one embodiment of the invention.

FIG. 10 illustrates a flow diagram in accordance with one embodiment of the invention. At block 400, a device is assigned a unique identifier. At block 410, a unique identifier is obtained from the device. The unique identifier may be obtained by a variety of methods such as by executing installation or driver update code. At block 420, the unique identifier is used as a lookup key in a mapping table. At block 430, the address of a driver is returned. At block 440, a driver is downloaded.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A computer-implemented method comprising:
   identifying a device by a unique identifier stored within the device;
   obtaining the unique identifier from the device; and
   using the unique identifier in conjunction with a mapping table, wherein the mapping table contains at least a column containing a plurality of unique identifiers of devices coupled to a column containing a plurality of updateable addresses of one or more drivers specific to each device, to obtain an address of one or more drivers for the device, and one or more columns that include additional information specifying a version of the driver to be utilized for the device.

2. The computer-implemented method of claim 1, wherein program instructions obtain the unique identifier.

3. The computer-implemented method of claim 1, wherein the driver is obtained from a storage medium.

4. The computer-implemented method of claim 1, wherein a mapping table address is obtained from the device.

5. The computer-implemented method of claim 4, wherein the mapping table address is obtained by using a service discovery protocol.

6. A machine readable storage medium containing executable program instructions which when executed cause a digital processing system to perform a method comprising:
   identifying a device by a unique identifier stored within the device;
   obtaining the unique identifier from the device; and
   using the unique identifier in conjunction with a mapping table, wherein the mapping table contains at least a column containing a plurality of unique identifiers of devices coupled to a column containing a plurality of updateable addresses of one or more drivers specific to each device, to obtain an address of one or more drivers for the device, and one or more columns that include additional information specifying a version of the driver to be utilized for the device.

7. The machine readable storage medium of claim 6, wherein program instructions obtain the unique identifier.

8. The machine readable storage medium of claim 6, wherein the driver is obtained from a storage medium.

9. The machine readable storage medium of claim 6, wherein a mapping table address is obtained from the device.

10. The machine readable storage medium of claim 9, wherein the mapping table address is obtained by using a service discovery protocol.

11. The machine readable storage medium of claim 6, wherein the unique identifier is represented by one of a manufacturer, a device class, a model number and a sub-number.

12. A system comprising:
   a processor; and
   a memory coupled to the processor comprising a machine-readable medium having a machine-readable program embodied therein for directing operation of the system, the computer-readable program comprising:
   identifying a device by a unique identifier stored within the device;

obtaining the unique identifier from the device; and using the unique identifier in conjunction with a mapping table, wherein the mapping table contains at least a column containing a plurality of unique identifiers of devices coupled to a column containing a plurality of updateable addresses of one or more drivers specific to each device, to obtain an address of one or more drivers for the device, and one or more columns that include additional information specifying a version of the driver to be utilized for the device.

13. The system of claim 12, wherein program instructions obtain the unique identifier.

14. The system of claim 12, wherein the driver is obtained from a storage medium.

15. The system of claim 12, wherein a mapping table address is obtained from the device.

16. The system of claim 15, wherein the mapping table address is obtained by using a service discovery protocol.

17. The system of claim 12, wherein the unique identifier is represented by one of a manufacturer, a device class, a model number and a subnumber.

* * * * *